United States Patent
Bowman

(10) Patent No.: US 6,677,978 B2
(45) Date of Patent: Jan. 13, 2004

(54) METHOD AND SYSTEM FOR AUTOMATED CALL GRAPH LAYOUT

(75) Inventor: Kevin A. Bowman, Austin, TX (US)

(73) Assignee: Forgent Networks, Inc., Austin, TX (US)

( * ) Notice: Subject to any disclaimer, the term of this patent is extended or adjusted under 35 U.S.C. 154(b) by 0 days.

(21) Appl. No.: 10/355,858

(22) Filed: Jan. 31, 2003

(65) Prior Publication Data

US 2003/0142202 A1 Jul. 31, 2003

Related U.S. Application Data

(60) Provisional application No. 60/353,743, filed on Jan. 31, 2002.

(51) Int. Cl.[7] .................................................. H04N 7/14
(52) U.S. Cl. ................................... 348/14.09; 348/14.08
(58) Field of Search ........................... 348/14.01–14.09, 348/14.1, 14.11–14.13; 345/853, 969; 370/260, 261; 709/204; H04N 7/14

(56) References Cited

U.S. PATENT DOCUMENTS 6,020,916 A * 2/2000 Gerszberg et al. ......... 348/14.01
2002/0015108 A1 * 2/2002 Takashima et al. ......... 348/484

* cited by examiner

Primary Examiner—Melur Ramakrishnaiah
(74) Attorney, Agent, or Firm—Hamilton & Terrile, LLP; Robert W. Holland

(57) ABSTRACT

An automated video call graph layout engine accepts video call configuration information and presents a video call graph of the video call to resemble a video network topology. For instance, video call configuration information is accepted in a tree structure that lists video devices of the video call. Video device graph nodes are constructed for each video device, each node having a radius and links to other video devices. Super graph nodes are created by identifying leaf and branch graph nodes and constructing a super graph node for each branch graph node by interconnecting the leaf graph nodes with the branch nodes. A video call graph layout is completed by identifying leaf and branch super nodes and associating leaf super nodes to branch super nodes until all video devices are interconnected.

14 Claims, 7 Drawing Sheets

METHOD AND SYSTEM FOR AUTOMATED CALL GRAPH LAYOUT

RELATED APPLICATION

This patent application claims priority from U.S. Provisional Patent Application serial No. 60/353,743, entitled "Automated Call Graph Layout" and filed on Jan. 31, 2002 naming Kevin A. Bowman as inventor.

BACKGROUND OF THE INVENTION

1. Field of the Invention

The present invention relates in general to the field of video conferencing, and more particularly to a method and system for automated call graph layout of a video call.

2. Description of the Related Art

Video conferencing has grown in popularity, especially as a business tool, because it gives participants an opportunity to visually interact without having to travel to the same location. As a result, many businesses have made substantial investments in video networks, including endpoint, MCU, gateway and gatekeeper video devices that interact with each other through a network or that interact with other video devices through public networks, such as the Public Switched Telephone Network or the Internet. A typical business video network has a number of video devices geographically dispersed though out a number of locations and managed by a staff, such as information technology personnel. Further, as video conferencing by Internet Protocol has become more common, business video networks have migrated some video device functionality to modules running on servers and personal computers.

Active video network management is one important factor in whether a business is able to use its video network effectively. A video conference call between several video endpoints often presents a complex scheduling and configuration problem involving a number of video devices. Typically, a video network administrator performs scheduling and configuration by interfacing individually with video devices through a network administration computer or server. Manual scheduling and configuration of video devices is time consuming and prone to errors. For instance, video devices, such as endpoints, MCU's and gateways, often have specific configuration requirements in order to successfully complete a video call. A network administrator may attempt to manually layout a graphical representation of video call nodes as a video call is configured, however manually generated graphical layouts are inefficient, prone to error and difficult to adapt to changes in a call configuration.

Recent improvements developed by Forgent Networks, Inc. automate scheduling and configuration of video devices to establish desired video calls. Video network administrators input desired video call parameters and Forgent's management platform automatically generates valid video call configurations between selected endpoints by assigning MCU's and gateways as needed to support the endpoints. However, an automatically generated video call can be quite complex with an arbitrary number and arrangement of endpoints, MCU's and gateways typically output with a tree structure. Complex video calls are difficult to visualize and thus difficult for administrators to understand and manage, especially if a video call configuration is simply defined by a list or tree of video devices. Tree structures generally do not emphasize the individual connections between video devices, make it difficult to show the direction of connections and are not generally visually intuitive to understand, especially for network administrators used to network topology views.

SUMMARY OF THE INVENTION

Therefore a need has arisen for a method and system which graphically lays out a video call to resemble a network topology from an automatically created video call configuration to aid in visualization and management of the video call.

In accordance with the present invention, a method and system are provided which substantially reduce the disadvantages and problems associated with previous methods and systems for presenting a video call configuration. A video call configuration is automatically translated from a tree structured call definition to a visually more intuitive graph structure that resembles the network topography of the video devices in the video call.

More specifically, an automated video call graph layout engine accepts a video call configuration organized as a tree structure and automatically outputs a video call graph layout for display of the video call configuration. A graph node for each video device of the video call tree structure is constructed with a radius and links to video devices proximate to the graph node video device in the tree structure. The video device graph nodes are then identified as leaf graph nodes having a single link or branch graph nodes having plural links. Super graph nodes are constructed from the video device graph nodes by associating leaf graph nodes to the branch graph node to which the leaf graph nodes are linked and by adding invisible nodes to each branch graph node that connects to another branch graph node. The constructed super graph nodes are identified as leaf super nodes or branch super nodes by determining the number of invisible nodes associated with each super graph node. A video call graph layout is constructed by associating super graph nodes with each other by interconnecting leaf super graph nodes to their associated branch graph node until all video device graph nodes of the video call are interconnected.

The present invention provides a number of important technical advantages. One example of an important technical advantage is that a general video call involving an arbitrary number and arrangement of video devices is displayed as a network topology that resembles the physical arrangement of the video devices in the video call, and is thus intuitive for network administrators to understand. Automated video call graph layout from video call configuration information provides improved understanding of automated video call configuration outputs from video management platforms by emphasizing the individual connections between video devices and by showing the direction of connections. Network administrators are able to rapidly view and understand complex video calls to adjust video call configurations or monitor video call performance, with updates and changes to a video call configuration also displayed rapidly with an understandable graphical layout.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Effective management of a video network typically calls for monitoring of scheduled and active video calls so that problems are identified and corrected in a prompt manner with as little interference as possible with video network operations. Many video networks are complex and include a great number and variety of video devices, including video endpoints, MCU video devices and gateway video devices. When video calls are automatically configured, especially complex video calls involving a large number and variety of video devices, the nature of the video calls is often not readily apparent to network administrators or intuitive from automatically generated video call configuration information, such as video call configuration tree structures. The present invention aids in presentation of video call information by automatically generating a video call graph layout that displays video devices to intuitively resemble the topology of a video network.

Figure 1:
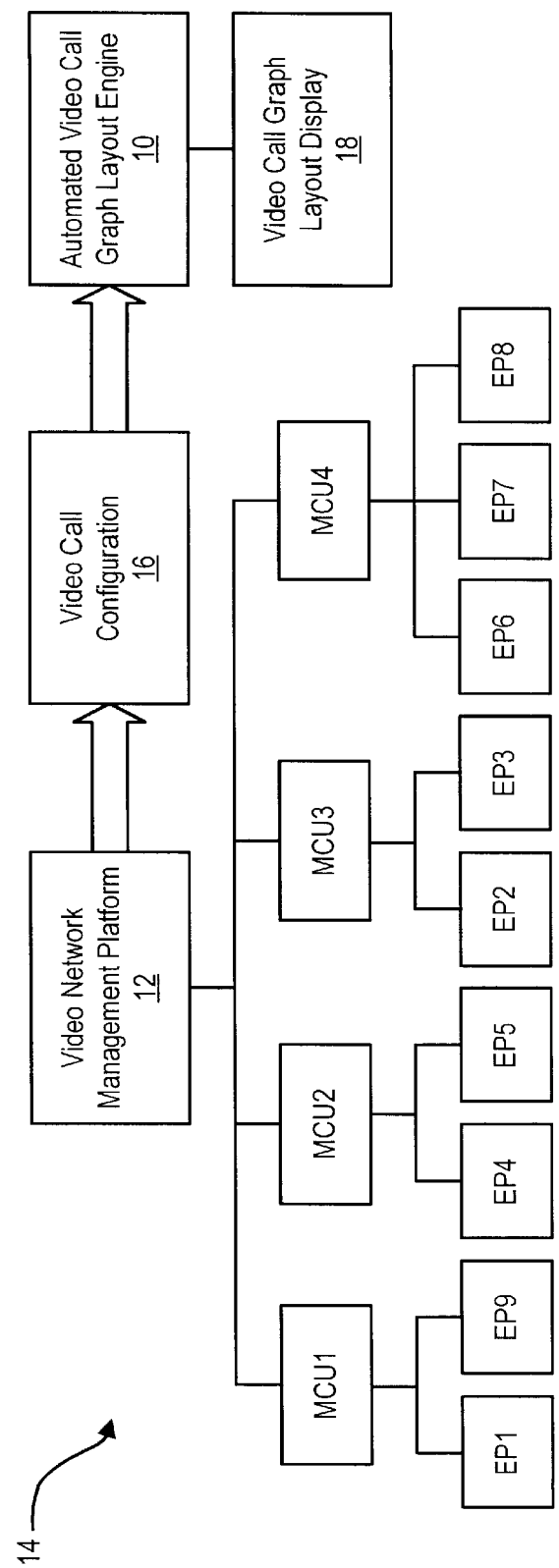
FIG. 1 depicts a block diagram of an automated video call graph layout engine interfaced with a video call management platform.

Referring now to FIG. 1, a block diagram depicts an automated video call graph layout engine interfaced with a video network management platform 12. Video network management platform 12 communicates with video devices 14 to configure video calls. For instance, a user or network administrator selects two or more endpoints for use in a video call and video network management platform 12 automatically adds MCU and gateway devices as needed to configure the video call between the selected video endpoints. A video call configuration 16 is output from video network management platform 12 to define the schedule and connection routine for the video call. Once the scheduled time for the video call arrives, video network management platform 12 initiates the call with the configured device and provides access to network administrators for monitoring and managing the video call.

Automated video call graph layout engine 10 receives video call configuration 16 and automatically generates a video call graph for the video call. The video call graph has a node for each video device of the video call with the nodes interconnected to resemble the video network topology of the video call. The video call graph visually emphasizes individual connections between video devices as well as the direction of video device connections to provide an intuitive view of the video call that resembles the network topology of the video devices in the video call. Automated video call graph layout engine 10 provides the video call graph to a video call graph layout display 18 that displays all or selected portions of the video call graph. For instance, video call graph layout display 18 associates device information with graph nodes so that a network administrator can view the video call as a whole or select nodes or sets of nodes for a more detailed review. In one embodiment, video call graph layout display interacts with video network management platform 12 to provide a management interface for the video call. Automated video call graph layout engine 10 updates the video call graph displayed by video call graph layout display 18 as video call configuration 16 changes due to management actions or changes in the video devices active in a video call.

Figure 2:
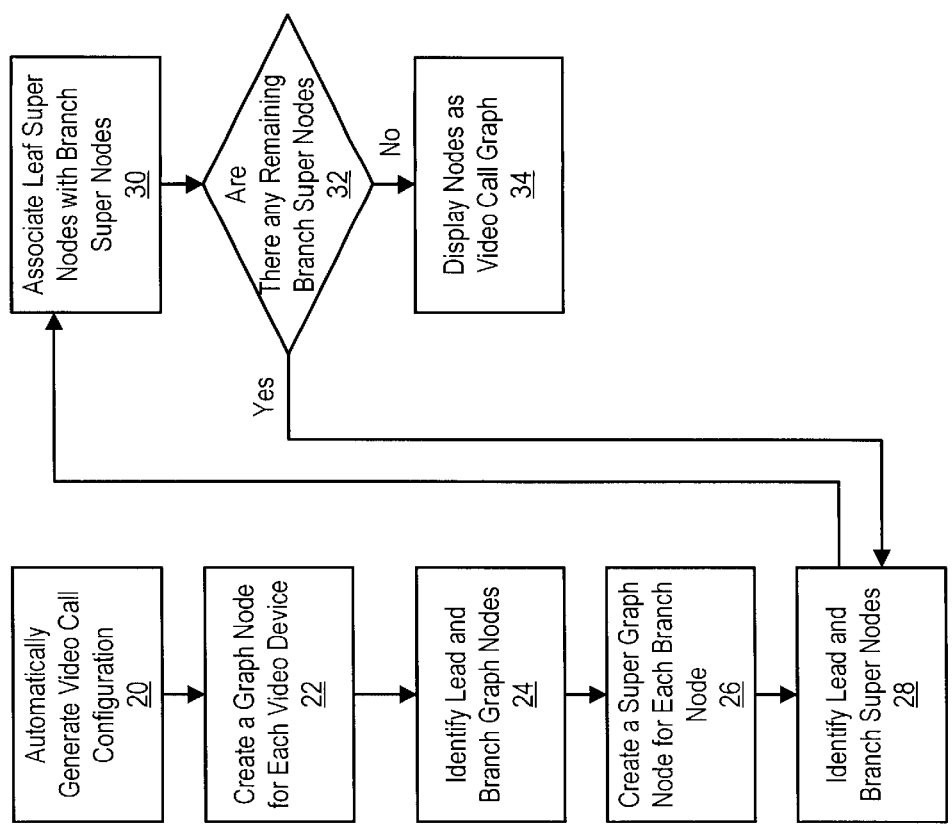
FIG. 2 depicts a process for automated video call graph layout from an automatically generated video call configuration.
Figure 3:
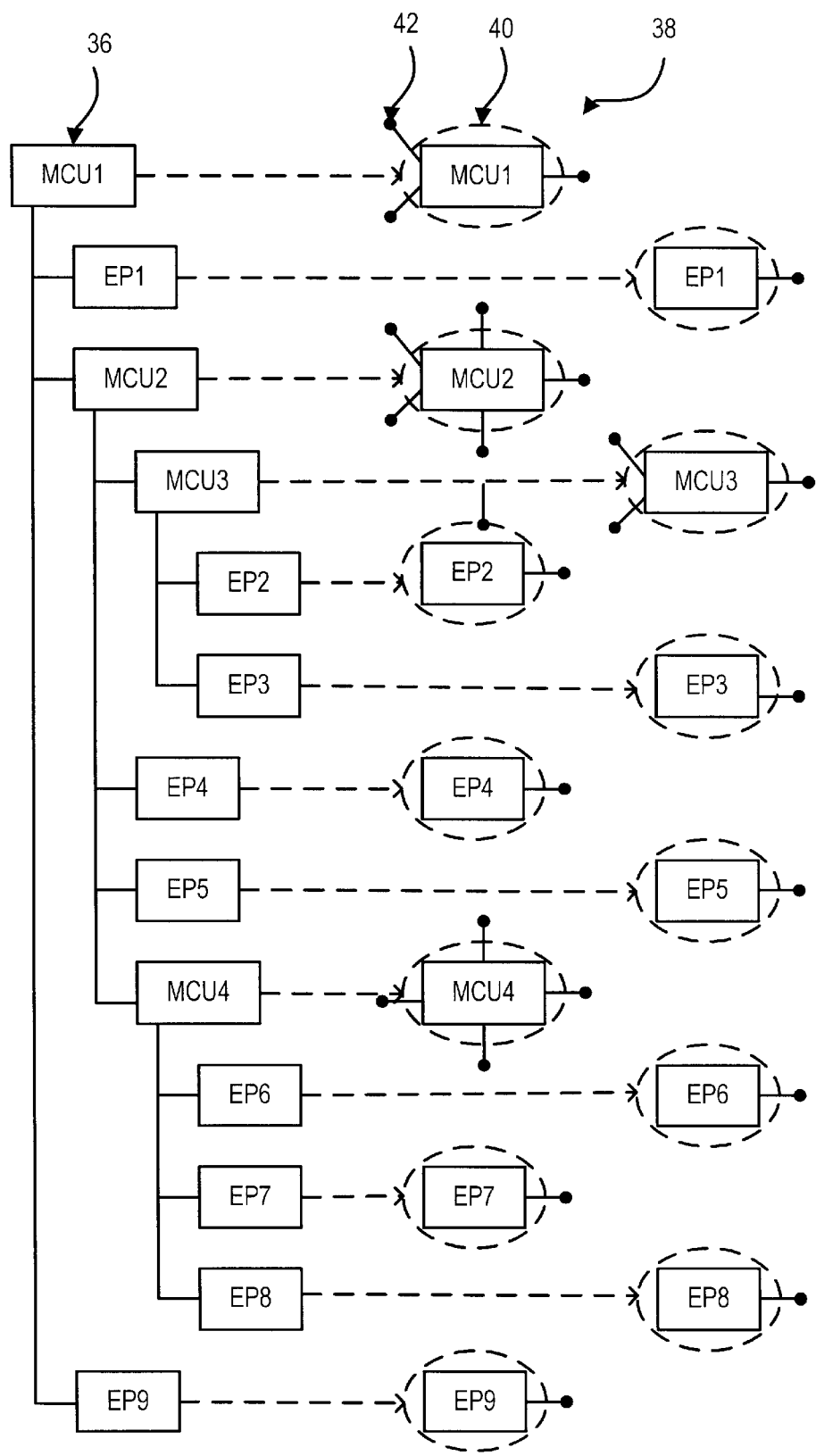
FIG. 3 depicts a video call configuration tree and associated graph nodes.

Referring now to FIG. 2 a process is depicted for automated video call graph layout from an automatically generated video call configuration. The process begins at step 20 with creation of an automatically generated video call configuration and continues to step 22 for the creation of a graph node for each video device included in the video call configuration. FIG. 3 depicts an example of an automatically generated video call configuration tree 36 generated at step 20 and video call graph nodes 38 created for each video device of video call configuration tree 36. Video call configuration tree 36 defines the configured relationship between video devices of a video call with the location of a device immediately underneath another device representing a physical connection between the two devices. For instance, video call configuration tree 36 depicts MCU1 as the root of the configuration tree and physically connected with EP1, MCU2 and EP3.

Video call configuration tree 36 is the underlying model for constructing a graph layout by creating a graph node 38 associated with each video device of configuration tree 36. Each graph node 38 associates with a video device and that video device's original device data and is created to include a radius 40 and a set of links 42. Each video device graph node 38 includes a link for each video device in configuration tree 38 immediately below the video device associated with the graph node plus one link for the parent of the video device associated with the graph node. For example, MCU2 is provided with a radius and five links, one link to its parent MCU1 and four links to its children, MCU3, MCU4, EP3 and EP4. The root of configuration tree 36 includes only links to child video devices since the root of configuration tree 36 does not have a parent video device. For example, MCU1 includes a radius and three links to its children MCU2, EP1 and EP9.

Referring back to FIG. 2, the process continues at step 24 with identification of each graph node 38 as a leaf graph node or a branch graph node. Leaf nodes have a single link to a single other device while branch nodes have plural links with each link to a different other device. Thus, a node is identified as a leaf or branch node by counting the number of links associated with the node. Alternatively, a node is identified as a leaf or branch node by the type of video device associated with the node. For instance, video endpoints are identified as leaf nodes and MCU and gateways are identified as branch nodes. For the graphical nodes 38 depicted in FIG. 3, each video endpoint EP1–EP9 is a leaf node having a single link and each MCU MCU1–MCU4 is a branch node having plural links.

Figure 4:
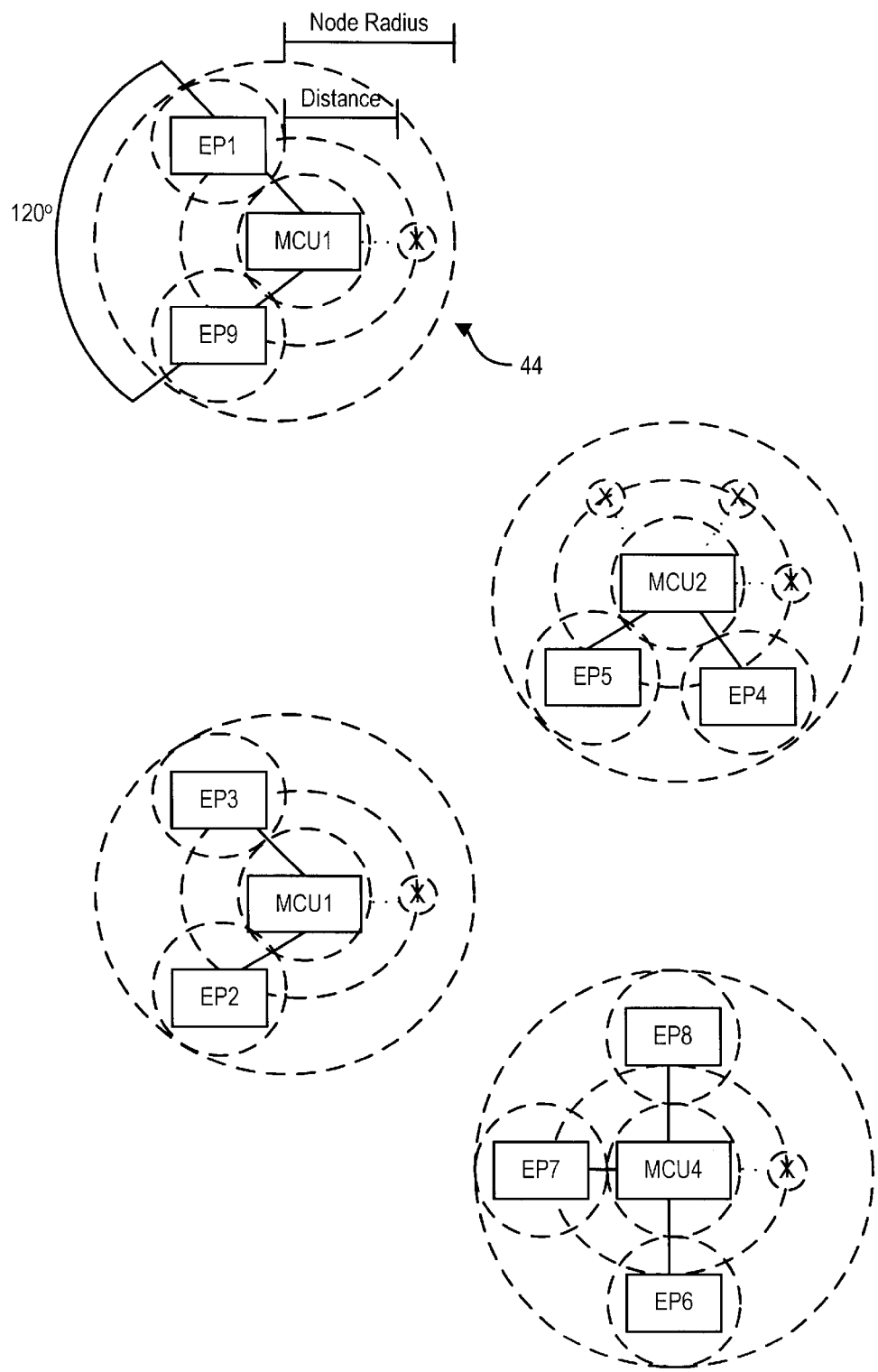
FIG. 4 depicts super nodes for the video call configuration tree graph nodes of FIG. 3.

After each graphic node is identified as a leaf node or branch node, the process continues to step 26 for creation of a super graph node for each branch node with a recursive process. FIG. 4 depicts the four super graph nodes 44 constructed from the graph nodes of FIG. 3. The center of each super graph node 44 is a branch graph node, MCU1–MCU4 in the examples constructed for FIG. 4. At a radius equal to the combined radius of the branch node and its associated leaf nodes, each link associated with the branch node is distributed at even radial distances. If a link associated with a branch node is to a leaf node, the leaf graph node is inserted at the end of the link. If a link associated with a branch node is to another branch node, an invisible node is attached to that link. The invisible node has a radius but is not associated with a video device, in video configuration tree 36. Invisible nodes are created to reserve room for a connection with the associated branch node within that branch node's own super graph node. For instance, the super graph node 44 in FIG. 4 for MCU1 includes two endpoint nodes, EP1 and EP9, and an invisible node generated due to MCU1's interface with MCU2. The minimum distance from the leaf and invisible nodes to the branch node is the sum of the branch and largest leaf node's radii. The radius of the super graph node is the sum of the branch node's radius and largest leaf node's diameter. The invisible nodes represent the links of the super graph node.

Figure 5:
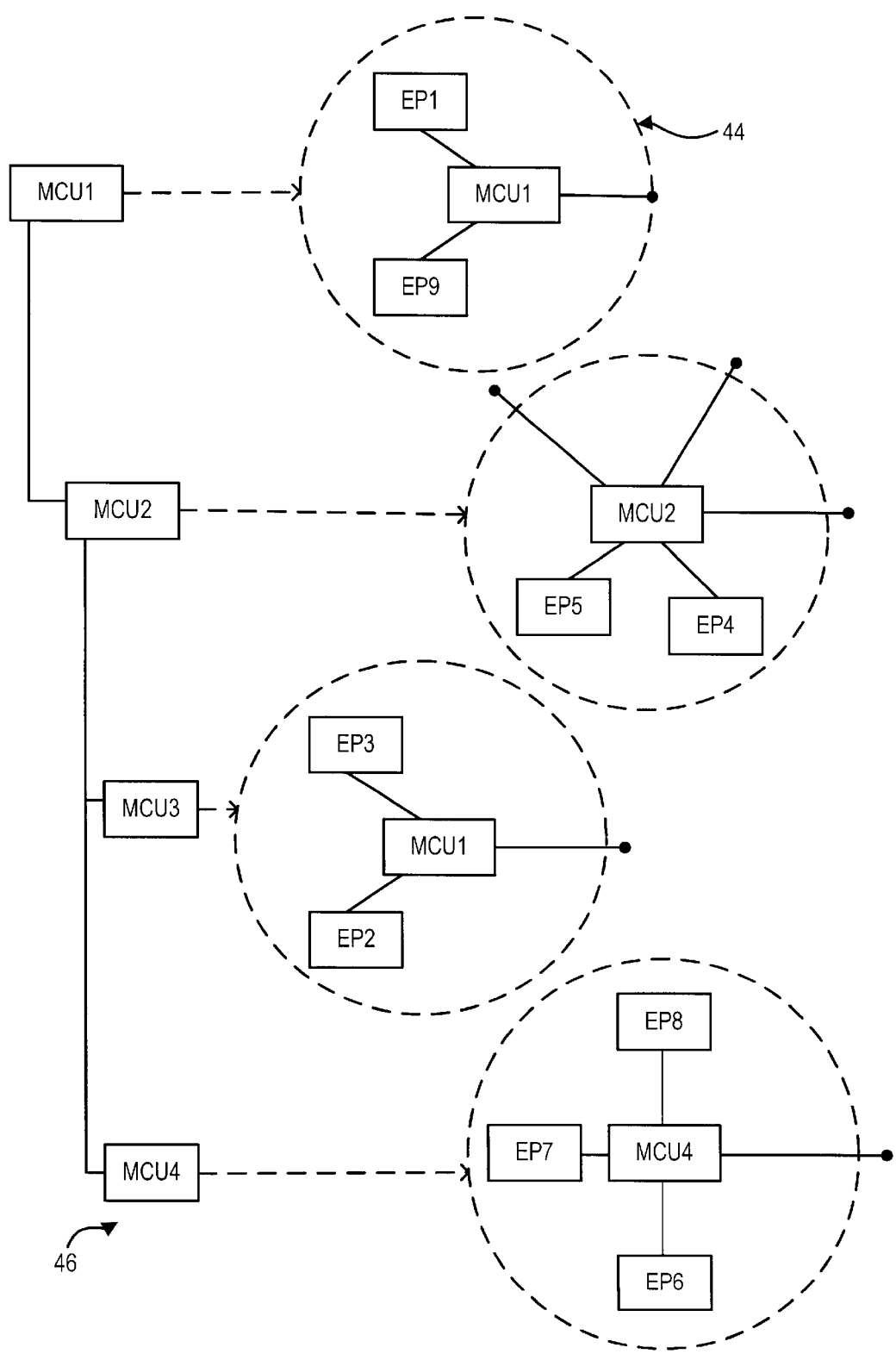
FIG. 5 depicts a reduce video configuration tree listing video devices associated with branch nodes.

Once a super graph node is completed for each branch graph node, each leaf node is contained within a super graph node. In effect, the leaf nodes are absorbed into branch nodes which are mapped to video devices associated with the branch nodes. For instance, in the example of FIG. 4, thirteen total graph nodes are reduced to four super graph nodes associated with the four MCU video devices as depicted by FIG. 5. The links of super graph nodes 44 depicted by FIG. 5 correspond to its parent and children elements in a reduced video configuration tree 46.

Figure 6:
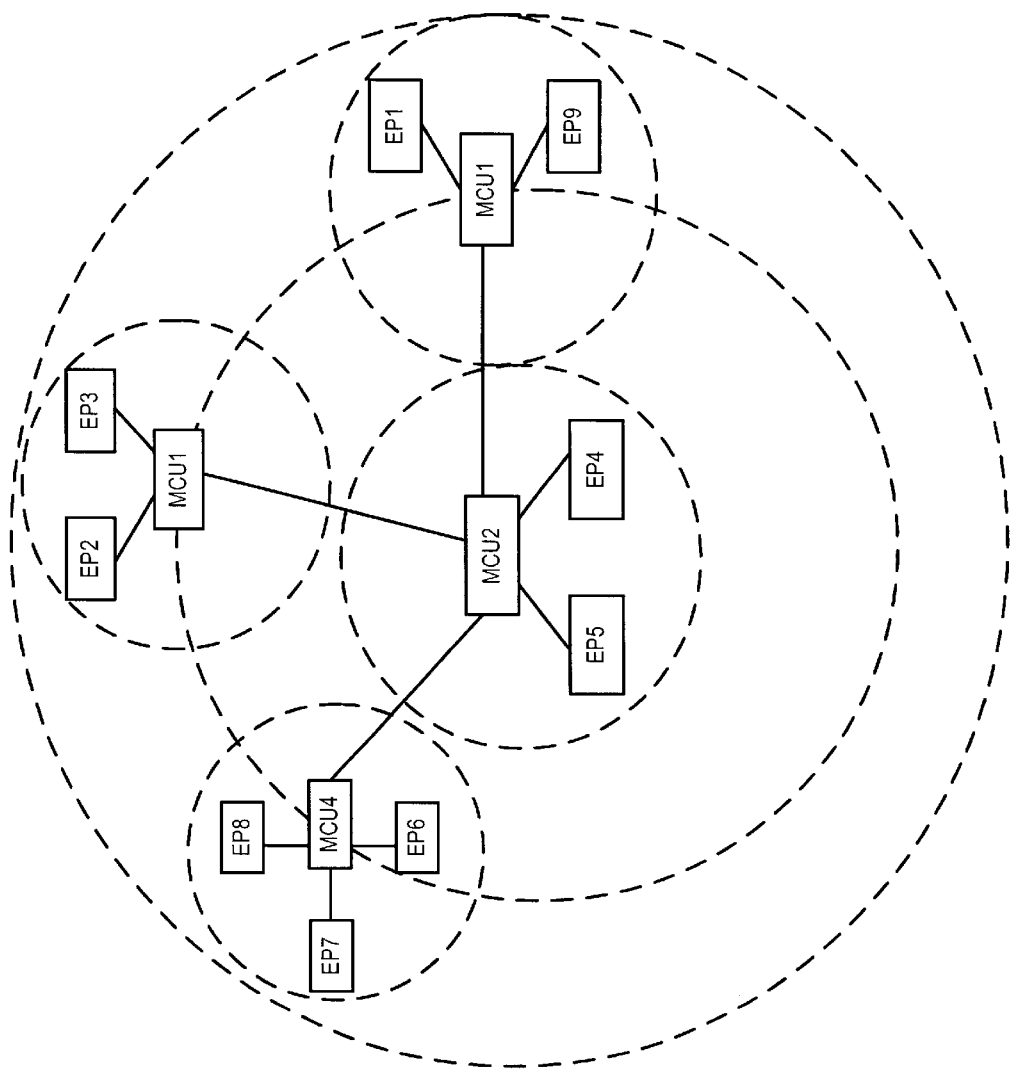
FIG. 6 depicts the relationship of the super nodes of FIG. 5 with each other.

Returning again to FIG. 2, once a super graph node is created for each branch node, the process continues to step 28 for identification of leaf and branch super graph nodes. A leaf super graph node contains only a single invisible link indicating a single connection to one other super graph node. A branch super graph node contains plural invisible links, each invisible link to a different super graph node. For instance, the super graph nodes depicted in FIG. 5 for MCU1, MCU3 and MCU4 are each leaf super graph nodes and the super graph node for MCU2 is a branch super graph node with three invisible links. Once the super graph nodes are identified as leaf or branch super graph nodes at step 28 of FIG. 2, the process continues to step 30 for the association of leaf super graph nodes with branch super graph nodes. A recursive analysis is applied similar to that used to create the super graph nodes at step 26 with each of the single links of the leaf super nodes attached to a corresponding link on a branch super graph node. As illustrated in FIG. 6, the one branch super graph node associated with MCU2 has three links that attach to the leaf super graph nodes associated with MCU1, MCU3 and MCU4, which each have a single invisible link.

Figure 7:
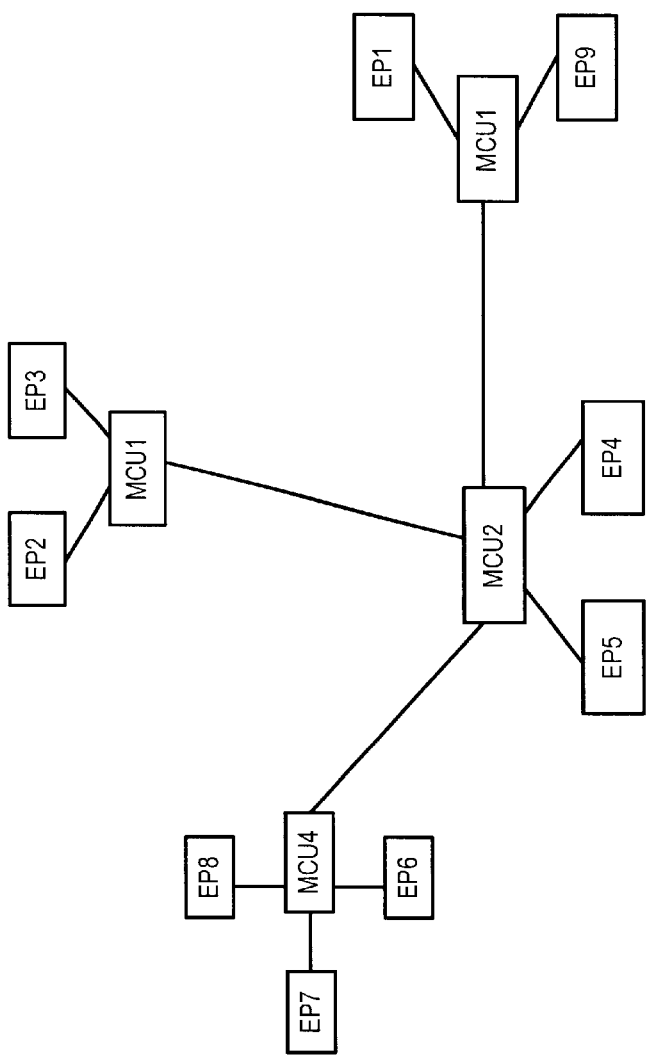
FIG. 7 depicts a call graph layout for the configuration tree of FIG. 3 that resembles the video network topology for the video call.

Since only one branch super graph node exists in the example of FIG. 6, the attachment of each leaf super graph leaf node to the super graph branch node completes the video call graph layout for the example video call as depicted by FIG. 7. The final super graph node of FIG. 6 depicts all of the original video endpoints and intermediate devices as well as the connections between the video devices in an easily understood graphic. However, in more complex video calls, additional iterations of identifying and generation super graph nodes may be needed to complete a video call graph layout. At step 32, the process of FIG. 2 determines if any remaining branch super nodes exist by checking if any super graph nodes remain with more than one invisible link. If branch super nodes remain, the process returns to repeat steps 28 and 30 until all invisible links are associated with each other. If the determination is no at step 32, the process continues to step 34 for display of the video call graph layout.

The display provided by a video call graph layout may be varied in orientation and size by varying the radius and placement of graph nodes. For instance, video calls having more in depth tree structures, such as video calls with a large number of gateway devices, may use reduced space for depicting gateways compared with other video devices, or may combine gateways with endpoint video devices for display. The display may also be varied by selectively expanding and collapsing super graph nodes. For instance, selecting a MCU with a mouse collapses the super graph node associated with the MCU to hide endpoints associated with the MCU. Reselection of the MCU expands the super graph node to depict other video devices within that super graph node in addition to the MCU.

Although the present invention has been described in detail, it should be understood that various changes, substitutions and alterations can be made hereto without departing from the spirit and scope of the invention as defined by the appended claims.

What is claimed is:

1. A system for presenting a video call graph of a video call having an arbitrary number and arrangement of video devices across a video network, the system comprising:

a video device management platform operable to automatically generate a video call configuration for a video call using plural video devices, the plural video devices comprising video endpoints, MCU's and gateways;

a video call graph layout engine interfaced with the video management platform and operable to accept the video call configuration and automatically generate a video call graph having a node for each video device of the video call, the nodes interconnected to resemble the video network topology of the video call, the video call graph layout engine automatically generating a video call graph by creating a node for each video device of the video call, classifying each node as a leaf node or a branch node, creating a super graph node for each branch node, each super graph node having a branch node ad leaf nodes associated with the branch node, and interconnecting the super graph nodes to resemble the video call network topology; and a video call graph layout display interfaced with the video call graph layout engine and operable to display all or selected portions of the video call graph.

2. The system of claim 1 wherein interconnecting the super graph nodes to resemble the video call network topology comprises classifying each super graph node as a leaf super graph node or a branch super graph node and associating leaf super graph nodes with branch super graph nodes.

3. The system of claim 2 wherein branch super graph nodes comprise super nodes having plural interconnections with other super graph nodes and leaf super graph nodes comprise super nodes having a single interconnection with a single other super graph node.

4. The system of claim 1 wherein the video call layout engine classifies MCU video devices as branch nodes.

5. The system of claim 1 wherein the video call layout engine classifies gateway video devices as branch nodes.

6. The system of claim 5 wherein the video call graph layout display selectively collapses the video call graph associated with gateways to compress the video call graph size.

7. A method for presenting a video call graph of a video call having an arbitrary number and arrangement of video devices across a video network topology, the method comprising:

generating a video call configuration for a video call having plural video devices;

creating a graph node for each video device of the video call, each graph node having one or more links, each link associated with a video device that interfaces with the graph node's video device;

identifying each graph node as a leaf graph node or a branch graph node;

creating a super graph node for each branch graph node by connecting each leaf graph node to its linked branch node;

identifying each super graph node as a leaf graph node or a branch super graph node; and creating a video call graph by connecting each leaf super graph node to its linked branch super graph node.

8. The method of claim 7 wherein creating a video call graph further comprises:

repeating the identifying each super graph node as a leaf node or a branch node step after each creating a video call graph step until only leaf super graph nodes are identified; and completing the video call graph by connecting each leaf super graph node to its linked leaf super graph node.

9. The method of claim 7 wherein the video devices comprise two or more of video endpoints, MCUs and gateways.

10. The method of claim 9 wherein creating a graph node further comprises:

associating a radius with each graph node; and adjusting the radius of gateway video devices to compress or expand the video call graph.

11. The method of claim 9 wherein identifying each graph node further comprises:

identifying video endpoints as leaf graph nodes; and identifying MCU video devices as branch graph nodes.

12. The method of claim 9 wherein identifying each graph node further comprises:

identifying nodes having a single link as leaf nodes; and identifying nodes having plural links as branch nodes.

13. The method of claim 7 wherein the video call configuration comprises a tree structure having a root node and plural child nodes and wherein creating a graph node for each video device further comprises:

creating a graph node for a video device by including links for each parent and child node of the tree structure associated with the video device.

14. The method of claim 7 further comprising:

displaying the video call graph to resemble the video network topology; and associating each displayed node with configuration information for the video device associated with the node.

* * * * *